United States Patent Office 2,739,899
Patented Mar. 27, 1956

2,739,899

CURING OF MEAT

Clifford M. Hollenbeck, Woodbridge, N. J., assignor to Merck & Co., Inc., Rahway, N. J., a corporation of New Jersey No Drawing. Application February 4, 1950, Serial No. 142,532

8 Claims. (Cl. 99—159)

This invention relates to the curing of meat, and more particularly to a method of accelerating the process of curing meat and for producing a product of improved quality, and the new compositions useful for this purpose.

Originally, the main purpose of curing meat was to preserve the meat without refrigeration; the so-called curing process consisting essentially of the addition of salt. However, it was found later that meat cured with sodium nitrate and/or sodium nitrite produced a product with a desirable heat stable red or pink color. Thus, meats cured with nitrate or nitrite retain their characteristic red color even after cooking. In addition to using agents which preserve the meat and its color, it is common practice today to use sugars in the curing process for the desirable flavor which they impart to the meat.

The treatment of meat with sodium nitrate and/or sodium nitrite apparently results in the formation of a pink-colored pigment, nitrosohemoglobin which on heating is converted to another pink pigment, nitrosohemochromogen.

The conversion of the hemoglobin contained in meat to the nitroso form is dependent upon the reduction of sodium nitrate or sodium nitrite to nitric oxide which in turn combines with the hemoglobin to form the desired pink nitrosohemoglobin. At one time only nitrates were used in the curing of meats and a complete cure depended upon the bacterial reduction of the nitrate to the nitrite form, and the subsequent decomposition of the nitrous acid under the acid reducing conditions prevalent in the curing process to yield the nitric oxides. Since it was evident that the nitrate acted as a source of the nitrite, in present day practice it is preferred to add sodium nitrite along with the nitrate in the curing process. Thus, any chance of an "undercure" resulting from a failure to obtain a bacterial reduction of the nitrate to the nitrite is minimized.

In addition to salt, and sodium nitrate and/or sodium nitrite, it is common practice today to employ a sugar such as cane, beet, or corn sugar. The sugar is largely added for its flavor although the presence of this material during curing stages is also of importance in producing the reducing conditions necessary for the conversion of sodium nitrate to sodium nitrite and the subsequent liberation of the nitric oxide. Thus, in general, four ingredients namely sodium nitrate, sodium nitrite, sugar and salt are used in the curing of meat.

In carrying out this curing, two basic methods are employed. In the first method, the so-called "dry cure" process, a dry mixture of the curing agents is rubbed on the surface of the meat and the meats are allowed to stand until the agents penetrate through the interior of the meat by diffusion and are uniformly distributed. Thus, bacon is commonly cured by this method, requiring a period of fifteen to thirty days to effect a completely uniform cure. In the case of comminuted meats such as sausage, the dry curing agents are simply mixed with the ground meat.

In the second general method, the curing agents are dissolved in water to form a so-called "pickle" in which the meats are soaked; the curing being effected by the diffusion of the pickling solution through the meat. It is also common practice to inject a pickle solution into the vascular system of certain cuts of meat to effect a more rapid diffusion of the curing agents. Alternatively, the pickle can be injected directly into the muscle itself thus shortening the time necessary to effect complete curing. Also, a combination of pickle injection and soaking procedures can be used. Thus, hams can be cured in from three to fifteen days by employing a combination of injection and soaking procedures.

It will be observed from the foregoing that all of these curing practices require that the meat be treated for a considerable length of time, for example up to thirty days, in order to achieve a complete curing. During this long period of time the meats are subject to deterioration or oxidation by the presence of air, bacteria, or molds, and the curing process, which depends at least in part upon the uncertain action of bacteria, cannot be satisfactorily controlled.

It is therefore an object of this invention to provide a method for accelerating the curing of meat and for developing the red color thereof which avoids some of the disadvantages of present curing processes. Thus, by effecting the cure more rapidly, it is possible to avoid deterioration of the meat by oxidation and the subsequent development of rancidity, the undesirable absorption of excessive amounts of the curing liquid by the meat, and the dependence on uncertain bacterial action to effect the cure. In addition, my accelerated cure makes it possible to increase the production capacity of available curing equipment. Another object of my invention is to provide a method of curing to produce a meat of superior flavor.

In accordance with one embodiment of my invention, I have now found that it is possible to reduce the curing time considerably by effecting the curing of meat with agents containing a source of nitric oxide in the presence of a compound containing an enediol group, i. e.,

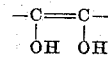

such as ascorbic acid, d-isoascorbic acid, reductone, dihydroxymaleic anhydride, d-glucoascorbic acid, and the like. The addition of such a component either prior to, concomitantly with, or after the usual curing agents effects a marked acceleration of the cure and in addition permits a more controlled curing process resulting in a cured meat of superior flavor.

These compounds containing an enediol grouping are all valuable in carrying out a more rapid curing of meat. One of the members of this class of compounds, namely, ascorbic acid or vitamin C, is particularly outstanding for this purpose. Ascorbic acid, in addition to being most effective in accelerating the rate of curing, has an added advantage in that it is a naturally-occurring vitamin of recognized and accepted value as a food component. Therefore, it is presently preferred to utilize ascorbic acid to obtain the maximum benefit of my invention.

In accordance with a further embodiment of my invention, it is found that these desired compounds containing an enediol group can be utilized in any of the common methods now used for curing. For example, the enediol compound can be used either in the so-called "dry cure" process by adding the enediol compound to the usual dry curing mixtures, or dissolving it in the pickle solution.

These enediol compounds are suitable for incorporation in curing mixtures which also contain sugars. It is possible to achieve the beneficial results obtained by my invention using the enediol compounds with either a nitrate or a nitrite, or if desired it can be used with a mixture of both nitrate and nitrite. In fact, excellent results have been obtained curing ground beef using only a mixture of sodium nitrate and ascorbic acid. This curing was effected in a short period of time and the resulting product retained its characteristic red color on prolonged storage in the frozen state.

In addition to the remarkably accelerated cure obtained through the inclusion of an enediol containing compound with the curing agents, there are a number of other advantages gained by the use of such compounds. The reduction of the sodium nitrite and/or sodium nitrate is accomplished in a more controlled fashion thus eliminating the need of relying on bacterial fermentation to effect the reduction. In addition, the reducing conditions are produced in the meat from the start of the curing process and inhibit the formation of or reduce the amount of methemoglobin, an undesirable brown pigment, produced. The enediol containing compounds also act as antioxidants and inhibit the oxidation of the fats, etc., during the curing process and subsequent storage. The reduced curing period also minimizes the chance of bacteria, air or mold spoilage during the curing process. In addition, when ascorbic acid is used as a source of the enediol grouping, a very desirable naturally-occurring nutrient, vitamin C, is added to the meat. Also, it is found that meats cured with ascorbic acid have a superior flavor in comparison to those cured in the usual manner.

In accordance with my invention, I have found that these compounds containing an enediol grouping can be added to the other curing agents in an amount dependent upon the method of curing used, the product being cured and the desired acceleration of curing which is to be effected. For most practical purposes I have found that it is desirable to add these compounds in an amount ranging from about 0.01 to about 0.05% (based on the weight of the meat) to dry curing mixtures, and 0.002 to 0.2% to pickle solutions. However, while these are preferred ranges for most practical purposes, larger amounts can also be used if desired. For example, in curing pork bellies for bacon, the following is a typical dry cure for 100 pounds of bellies: 3 lbs. salt, 2 lbs. cane sugar, ¼ oz. sodium nitrite, 2 oz. sodium nitrate, and ¼ oz. of an enediol compound such as ascorbic acid. The addition of the enediol compound results in shortening considerably the time required to effect a complete cure of the bellies.

In the wet curing of pork hams, shoulders, and the like, in accordance with my invention, injecting and covering pickles having the following typical compositions can be used:

| Ingredient | Injecting Pickle, Percent | Covering Pickle, Percent |
|---|---|---|
| Sodium Nitrate | 0.10 | 0.08 |
| Sodium Nitrite | 0.10 | 0.05 |
| Sugar | 2.5 | 1.50 |
| Salt | 24.0 | 15.0 |
| Ascorbic Acid | 0.10 | 0.10 |

While in general, as indicated previously, it is preferred for practical purposes to add the enediol containing compound to the dry mixture or pickle solution of the usual curing agents, the accelerated cure can also be effected either by adding such a compound prior to or subsequent to treatment with the usual curing agents. For example, in the dry curing process, the meat can be rubbed with the enediol compound either before or after the usual curing agents are used. Similarly, in the wet process the meat can be soaked or injected with a solution of the enediol compound prior to or after the application of the usual pickle solution. However, in general, the practice of the invention is facilitated by using the new compositions comprising the curing agents and a compound containing an enediol grouping.

In addition to using these enediol containing compounds to accelerate the rate of curing, they can be also utilized effectively in treating meats which are to be stored in the frozen state in order to prevent any color deterioration. Thus, I have found that the addition of 0.018% (based on the weight of the meat) of ascorbic acid in addition to a small quantity of sodium nitrate will very rapidly produce a mild cure of ground beef which can then be stored in the frozen state and still retain the bright red appearance of freshly ground beef.

A remarkable feature of my invention is that the meat cured in the presence of an enediol compound is superior in flavor to meats cured without such agents. For example, sausage or baloney cured with the usual agents to which was added a small amount of ascorbic acid had a better flavor than the baloney cured without the added ascorbic acid.

The use of an enediol compound in meat curing has several other advantages, in addition to those discussed previously, which are of practical economic importance to the meat packer. For example, it is possible to decrease the amount of nitrate and/or nitrite used in the cure. In addition, in the case of meats which are smoked during curing, it is possible to decrease both the time and temperature in the smoking step thus decreasing evaporation losses and preventing excessive oxidation of the meat, as well as providing an increase in capacity of the equipment and a decreased fuel cost.

The following examples of my improved method of accelerating the curing of meats may be given:

EXAMPLE 1

Curing of chopped beef with a mixture of sodium nitrate and ascorbic acid was accomplished as follows:

Thirty gram samples of chopped beef were treated by dry mixing with the specified levels of sodium nitrate, sucrose and ascorbic acid. The meat samples were stored in the refrigerator at about 4° C. and examined periodically. The results are shown below:

| Sample | Percent of Curing Agents (by weight of meat) | | | Color of Sample | |
|---|---|---|---|---|---|
| | NaNO₃ | Sucrose | Ascorbic Acid | 3 days | 7 days |
| 1 | 0.050 | 0.650 | | brownish red | brown. |
| 2 | 0.050 | | 0.022 | bright red | bright red. |
| 3 | 0.050 | | | brownish red | red. |
| 4 | 0.050 | | 0.044 | bright red | bright red. |
| 5 | 0.050 | 0.650 | 0.044 | do | red. |
| 6 | | | 0.044 | brownish red | brown. |
| Control | | | | gray-brown | dark gray-brown. |

The results of these tests show that ascorbic acid increased the rate of cure of the samples of chopped beef. The chopped beef samples treated with sodium nitrate and sucrose eventually developed the bright red color of cured meat but it took 5–7 days longer than the samples treated with ascorbic acid. These tests would correspond to the curing of sausage and other comminuted meat products.

EXAMPLE 2

Sixty gram samples of chopped round steak were treated by dry mixing with the specified levels of curing agents. The samples were given what was believed to be a very light cure, then divided. One-half of each sample was stored at refrigerator temperatures (4–6° C.) and the other half stored in frozen state (−20° C.). The primary object of these tests was to determine whether meat could be given a light cure to retain its color during storage at freezing temperatures. The results are shown below:

*Samples stored at 6° C.*

| Sample | Percent of Curing Agents (by Weight of Meat) | | | | Color of Sample | |
|---|---|---|---|---|---|---|
| | NaCl | Ascorbic Acid | NaNO₃ | NaNO₂ | 3 Days | 5 Days |
| 1 | 0.023 | 0.018 | 0.005 | | red | red. |
| 2 | 0.023 | 0.018 | | 0.005 | gray-brown | bright red. |
| 3 | 0.023 | 0.018 | 0.003 | 0.003 | brown-red | Do. |
| 4 | 0.023 | | 0.003 | | do | brown-red. |
| 5 | 0.023 | | | 0.003 | gray-brown | brown. |
| Control | 0.023 | | | | brown-red | Do. |

*Samples stored at −20° C.*

| Sample | Percent of Curing Agents (by Weight of Meat) | | | | Color of Sample | |
|---|---|---|---|---|---|---|
| | NaCl | Ascorbic Acid | NaNO₃ | NaNO₂ | 3 Days | 6 Weeks |
| 1 | 0.023 | 0.018 | 0.005 | | bright red | bright red. |
| 2 | 0.023 | 0.018 | | 0.005 | gray-brown | Do. |
| 3 | 0.023 | 0.018 | 0.003 | 0.003 | brown | Do. |
| 4 | 0.023 | | 0.003 | | red | brown red. |
| 5 | 0.023 | | | 0.003 | gray-brown | brown. |
| Control | 0.023 | | | | red | Do. |

The light curing with sodium nitrate-sodium nitrite and ascorbic acid seemed to prevent the off-color development during storage in the frozen state. The results of these tests likewise indicated that the rate of curing of meat was significantly increased by the addition of ascorbic acid to the meat curing mixture. One additional important observation was made on these particular samples, namely, that the treatment of the meat with a curing mixture containing sodium nitrite, with or without ascorbic acid, turned the color of the meat to a gray-brown color. Presumably the gray-brown color was due to the formation of methemoglobin from the oxyhemoglobin in the meat. However, in the curing mixtures containing ascorbic acid a second change in color occurred and these gray-brown samples of meat turned a desirable bright red, presumably due to the conversion of the methomoglobin to hemoglobin and the formation of nitrosohemoglobin.

The samples of meat that were stored at 6° C. were cooked, and the color of the cured samples was retained after cooking. The flavor of the ascorbic acid treated samples was excellent in contrast to the controls which were inferior in both color and flavor.

EXAMPLE 3

The effect of adding ascorbic acid to curing solutions of the type used in the "wet curing" or "pickle curing" of hams, etc is shown in the following test:

A "pickling" solution was made up according to a formula published in Food Research 8, 78–87 (1943).

|  | Percent by weight |
|---|---|
| MaCl | 24.00 |
| Sucrose | 9.00 |
| NaNO₃ | 0.49 |
| NaNO₂ | 0.57 |
| Water | 65.94 |

To portions of the pickling liquor were added 0.5% ascorbic acid and 0.5% ascorbic acid–0.25% sodium bicarbonate mixture (by weight of solution), respectively, to determine the effect of these ingredients on the rate of curing.

Pieces of pork tenderloin about 1 cubic inch in size were immersed in the pickling liquors and the curing samples placed in the refrigerator at 4° C. The results are shown below:

| Sample | Curing Agent | | | Color of Sample | |
|---|---|---|---|---|---|
| | Plain Pickle | Ascorbic Acid | Sodium Bicarbonate | 1 day | 2 days |
| 1 | + | − | − | gray-brown | brown. |
| 2 | + | + | − | pink | pink-red. |
| 3 | + | + | + | do | Do. |

The results of this test show that the addition of ascorbic acid to the "wet" curing solutions markedly increased the rate of curing of pork cubes. The sodium bicarbonate was without effect in these tests since the pH of the curing solutions with or without ascorbic acid, were in the pH range for optimum curing (6.0–6.5).

The addition of sodium bicarbonate may be useful in conjunction with the use of ascorbic acid, in cases where the pH of the pickling liquor falls below 5.5.

Rapid curing is especially important in the wet curing process to prevent or to minimize the excessive imbibing of liquid by the meat during curing.

EXAMPLE 4

Thirty gram patties of fresh ground beef were treated by mixing with the following proportions of the dry curing agents:

| Sample | Percent Curing Agents (weight of the meat) | | | | |
|---|---|---|---|---|---|
| | NaCl | NaNO₃ | NaNO₂ | Ascorbic Acid | NaHCO₃ |
| 1 control | 0.000 | 0.000 | 0.0000 | 0.000 | 0.000 |
| 2 control | 0.000 | 0.000 | 0.0000 | 0.000 | 0.000 |
| 3 | 0.026 | 0.005 | 0.0016 | 0.033 | 0.000 |
| 4 | 0.026 | 0.005 | 0.0016 | 0.033 | 0.000 |
| 5 | 0.026 | 0.005 | 0.0016 | 0.026 | 0.006 |
| 6 | 0.026 | 0.005 | 0.0016 | 0.026 | 0.006 |
| 7 | 0.026 | 0.005 | 0.0016 | 0.022 | 0.010 |
| 8 | 0.026 | 0.005 | 0.0016 | 0.022 | 0.010 |
| 9 | 0.026 | 0.005 | 0.0016 | 0.000 | 0.000 |
| 10 | 0.026 | 0.005 | 0.0016 | 0.000 | 0.000 |

The samples of meat were stored in the refrigerator at 4° C., and after 3 days the following color observations were made:

Samples 1, 2—Brown with a few pink spots
Samples 3, 4—Pink-red, brown around edge
Samples 5, 6—Pink-red, brown around edge
Samples 7, 8—Brown, some redness
9, 10—Brown, no red The curing mixtures containing ascorbic acid develop the redness in meat much faster and more uniformly than those mixtures without ascorbic acid.

It should be mentioned here that the control samples developed the pink-red color of cured meat on extended storage, however, bacterial and oxidative changes also occurred during the extended storage and the samples spoiled while curing.

EXAMPLE 5

Comparative effect of ascorbic acid, d-isoascorbic acid and reduction in the "pickle" curing of pork.

Pieces of fresh pork shoulder (about 300–400 gr.) were injected with a "pumping pickle" (see composition below) and immersed in another "covering pickle" (see below), and stored at refrigerator temperature (4–6° C.). The meat samples were injected by means of a hypodermic syringe with about 15 cc. per pound of meat of a "pumping pickle," prepared according to Jacobs, Food Technology, vol. II, p. 678.

Injecting or pumping pickle

| | Percent |
|---|---|
| NaNO$_3$ | [1] 0.1 |
| NaNO$_2$ | [1] 0.1 |
| Sucrose | [1] 2.5 |
| Salt (NaCl) | [1] 24 |

Covering pickle

| | |
|---|---|
| NaNO$_3$ | [1] 0.08 |
| NaNO$_2$ | [1] 0.05 |
| Sucrose | [1] 1.5 |
| NaCl | [1] 15.0 |

[1] With or without 0.1% (by weight of solution) of ascorbic acid, d-isoascorbic acid or reductione.

The five meat samples studied in this experiment received the following treatment:

| Sample | Treatment |
|---|---|
| A | Control, regular pickles (Pumping and covering picles without addition of ascorbic acids or reductone). |
| B | Pumping and covering pickles containing 0.1% ascorbic acid. |
| C | Injected with ascorbic acid (equivalent in amount to that used in B) prior to treatment with pumping and covering pickles. Covering pickles contained 0.1% ascorbic acid. |
| D | Pumping and covering pickles containing 0.1% reductone. |
| E | Pumping and covering pickles containing 0.1% d-isoascorbic acid. |

Samples B, C and E developed a desirable red color within 3 hours after treatment. Cutting of the meat showed that the red color was fairly well developed throughout most of the interior. The control sample showed a light brown bleached color, and sample D (reductone) had the same appearance as the control after 3 hours.

After 24 hours, all the treated samples B–E were of a reddish-brown color on the exterior and a uniform red color in the interior. Control sample A was gray-brown on the outside with fair redness on the inside. After 3 days, samples B–E showed a better exterior color than the control, which was gray-tan. The interior colors of the samples treated with ascorbic acid and d-isoascorbic acid were better than the interior colors of control and the sample treatd with reductone, the latter being better than the control. The odor and the general appearance of the meat samples were good after 3 days.

EXAMPLE 6

Pork chops of about 100 g. weight each were surface treated with the following proportions of dry curing agents and stored in the refrigerator (4 to 6° C.) for observation. The ascorbic acid and d-isoascorbic acid were rubbed into the surfaces of the meat prior to the treatment with the mixture of the rest of the curing agents.

| Sample | Percent Curing Agents (by weight of pork chop) | | | | | |
|---|---|---|---|---|---|---|
| | NaCl | Sucrose | NaNO$_3$ | NaNO$_2$ | Ascorbic Acid | d-Isoascorbic Acid |
| 1 | 0.584 | 0.39 | 0.024 | 0.003 | 0.00 | 0.00 |
| 2 | 0.584 | 0.39 | 0.024 | 0.003 | 0.05 | 0.00 |
| 3 | 0.584 | 0.39 | 0.024 | 0.003 | 0.02 | 0.00 |
| 4 | 0.584 | 0.39 | 0.024 | 0.003 | 0.00 | 0.02 |

Samples 2, 3, 4 started to turn red within 3 hours after treatment, whereas the control was still light brown after 3 hours.

After 24 hours, samples 2, 3, 4 were of a red-brown color (cured meat color) whereas the control sample was brown on the outside with some redness on the inside.

After 3 days, the color of samples 2, 3, 4 was much better (pink versus brown) than the color of the control, and both the interior and exterior appearances of the treated samples was better than that of the control.

EXAMPLE 7

A quantity of freshly ground meat was mixed with the usual curing agents, sodium nitrate and sodium nitrite, and stuffed into casings. To a portion of the meat mixed with the curing agents was added 0.02% of ascorbic acid by weight of the meat. This meat was then stuffed into casings and smoked simultaneously with the meat subjected to the usual cure in a smoking chamber maintained at 150–180° F. for three hours.

After this smoking step, the sausage to which ascorbic acid was added had a redder color and appeared to be more fully cured from a flavor standpoint than the control.

EXAMPLE 8

A pork sausage baloney was prepared by the regular procedure, except in the case of the treated samples a solution of ascorbic acid (at the level of 200 mg. of ascorbic acid per pound of baloney) was added to the meat prior to grinding and stuffing. An equal amount of ice-water was added to the control. A sample of each of the ascorbic acid treated meat and the control meat were taken out of the "hot-smoke" oven at various intervals during the hot-curing-smoking process. Particularly, samples of the meat were taken out of the oven after the meat had attained each of the following temperatures: 140, 150, 160, 170° F. In all cases the samples cured by the aid of the ascorbic acid were better in color and flavor than the controls. Also, when slices of the baloney were placed in a desiccator under oxygen gas, the color of the control slices faded faster than the color of the ascorbic acid treated slices.

Modifications may be made in carrying out the present invention without departing from the spirit and scope thereof and the invention is to be limited only by the appended claims.

I claim:

1. A method of curing meat to accelerate the rate of curing obtained with a nitric-oxide-producing curing medium, which comprises contacting the meat, along with the curing medium, with an acidic water-soluble enediol-containing compound having from three to seven carbon atoms inclusive.

2. A method of curing meat to accelerate the rate of curing obtained with a nitric-oxide-producing curing medium, which comprises contacting the meat, along with the curing medium, with a compound selected from the group consisting of a source of ascorbate ions, a source of isoascorbate ions, a source of anions of reductone, a source of dihydroxymaleate ions, and a source of glucoascorbate ions.

3. A method of curing meat to accelerate the rate of curing obtained with a nitric-oxide-producing curing medium, which comprises contacting the meat, along with the curing medium, with a source of ascorbate ions.

4. A method of curing meat to accelerate the rate of curing obtained with a nitric-oxide-producing curing medium, which comprises contacting the meat, along with the curing medium, with a source of isoascorbate ions.

5. A method of curing comminuted meat to accelerate the rate of curing in the presence of a nitrite-providing curing medium, which comprises incorporating in the meat to be cured from about 0.01% to about 0.05%, based on the weight of the meat, of a compound selected from the group consisting of ascorbic acid, isoascorbic acid, reductone, dihydroxymaleic acid and glucoascorbic acid.

6. A method of curing comminuted meat to accelerate the rate of curing in the presence of a nitrite-providing curing medium, which comprises incorporating in the meat to be cured a compound serving as a source of ascorbate ions, the amount of such compound so incorporated in the meat being of the order of 0.01% to 0.05%, based on the weight of the meat.

7. A method of curing comminuted meat to accelerate the rate of curing in the presence of a nitrite-providing curing medium, which comprises incorporating in the meat to be cured a compound serving as a source of isoascorbate ions, the amount of such compound so incorporated in the meat being of the order of 0.01% to 0.05%, based on the weight of the meat.

8. A method of curing meat to accelerate the rate of curing in the presence of a nitrite-containing curing salt which comprises incorporating in the meat to be cured an amount of ascorbic acid of the order of 0.02% based on the weight of the meat.

References Cited in the file of this patent

UNITED STATES PATENTS

| Number | Name | Date |
|---|---|---|
| 1,911,009 | Woidich | May 23, 1933 |
| 2,002,146 | Jensen | May 21, 1935 |
| 2,147,261 | Lewis | Feb. 14, 1939 |
| 2,491,646 | Coleman et al. | Dec. 20, 1949 |
| 2,521,856 | Kraybill et al. | Sept. 12, 1950 |

OTHER REFERENCES

"Food Industries," November 1935, page 533, article entitled Acid Cure For Meat.

"Food Technology," October 1949, pages 332 to 336, inclusive, article entitled Antioxidants in the Hemoglobin Catalyzed Oxidation of Unsaturated Fats.